Sept. 21, 1937.  H. C. WRIGHT  2,093,534
HOUSEHOLD MIXER
Filed April 16, 1936
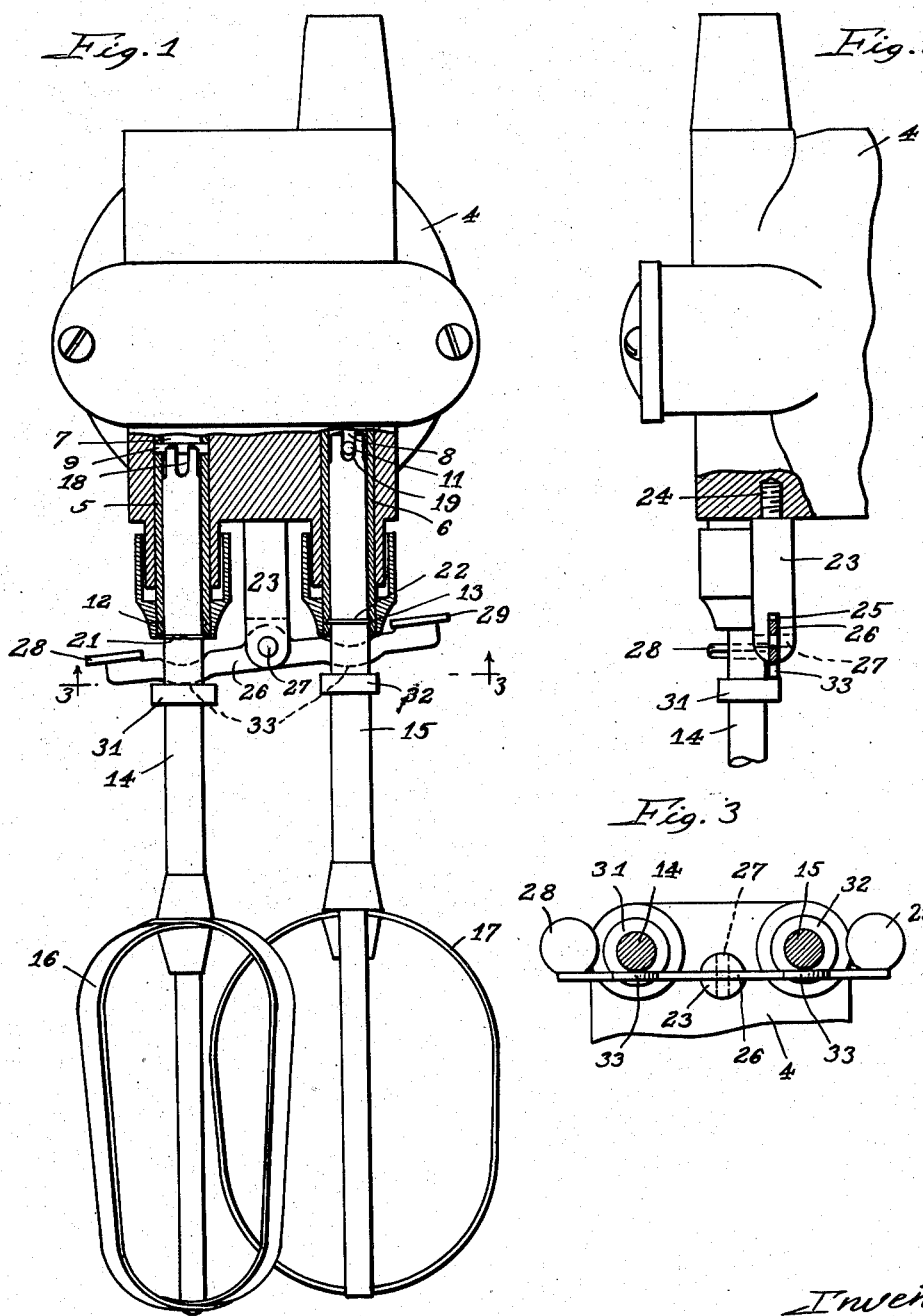
Inventor:
Horace C. Wright
By Wilson, Dowell,
McCanna & Wintercorn
Attys.

Patented Sept. 21, 1937

2,093,534

UNITED STATES PATENT OFFICE 2,093,534

HOUSEHOLD MIXER

Horace C. Wright, Chicago, Ill., assignor to Chicago Flexible Shaft Company, Chicago, Ill., a corporation of Illinois Application April 16, 1936, Serial No. 74,649

4 Claims. (Cl. 259—1)

This invention relates to household mixers of the type having a motor and motor casing, and wherein one or more beaters are releasably carried on the casing and driven by the motor.

Mixers of the type specified are used in the home for a number of culinary operations, and are frequently used repeatedly for mixing different types of food materials. As a result, it is necessary to frequently remove the beaters from the mixer for the purpose of washing the same or for the use of other culinary appliances. An objectionable characteristic of most of these mixers is the difficulty of removing the beaters from the mixer they being normally held thereon by frictional or spring engagement, which makes it necessary or most convenient for the operator to grasp the beater blades for their removal. Since the blades are commonly covered with the material which has just been mixed, this means that the hands of the operator will be soiled by this operation.

An important object of the invention is the provision of simple mechanical means for removing the beaters from the mixer.

A further object of the invention is the provision of the mixer wherein the beaters are held in their operative position by frictional or spring means and are releasable by a simple manual operation for removal thereof from the mixer.

Another object of the invention is the provision of a mixer construction of the type recited, wherein the beaters are selectively removable.

Other objects and advantages will be apparent from the following description and the accompanying drawing, in which—

Figure 1 is a front view of a mixer casing and beaters embodying my invention;

Fig. 2 is a side view thereof partly in section, and

Fig. 3 is a view on the line 3—3 of Figure 1.

The invention is illustrated herein as embodied in the well known type of household mixer wherein the numeral 4 designates the mixer casing within which is carried a motor (not shown) and suitable power transmission mechanism for driving spindles 5 and 6 which are rotatably carried in the casing 4 with their axes toward the vertical when the mixer occupies its normal operating position. In the construction herein shown the spindles 5 and 6 have longitudinally disposed sockets 7 and 8 provided with transverse pins 9 and 11 and annular recesses 12 and 13 adjacent their open ends. The sockets 7 and 8 serve for the reception of one end of beater shafts 14 and 15, the shafts carrying beater blades 16 and 17 at their opposite ends adapted to reach into material to be agitated. The upper ends of the beater shafts are slotted as shown at 18 and 19 for reception of the pins 9 and 11 when the beater shafts are inserted into the sockets 7 and 8 and moved longitudinally thereof to the operative or driven position, the pins and slots establishing driving connection between the spindles and the shafts. The beater shafts carry annular spring rings 21 and 22 adapted to seat in the annular recesses 12 and 13 on the spindles to retain the shafts in the driven position. These rings are so arranged that when a predetermined abnormal force is applied to the beater shafts tending to move them longitudinally of the spindle sockets, the rings will be compressed so as to slide into or out of the annular recesses 12 and 13, dependent upon the direction of such force.

A depending pin 23 is attached to the casing 4 intermediate the spindles 5 and 6, as shown at 24, and extends downward to a point adjacent the lower end of the spindles. The lower end of the pin 23 is slotted, as shown at 25, and receives a lever 26 which is pivotally secured therein by means of a pin 27. As will be seen from Figure 1, the pivotal support of the lever 26 is substantially midway between its ends, and the length of the lever is such that the ends thereof extend outward beyond opposite sides of the spindles 5 and 6, the opposed arms of the lever passing in close proximity to the shafts 14 and 15. The opposed ends of the lever 26 carry finger tabs 28 and 29 for manual rotation of the lever. In this instance the lever is stamped and formed from heavy gauge sheet metal. The shafts 14 and 15 are provided with collars 31 and 32 positioned on the shafts at a point to be engageable by the arms of the lever 26 when the shafts occupy their normal operative position with the rings 21 and 22 received in the annular recesses 12 and 13. This position is illustrated by the right hand beater facing Figure 1. When the beater occupies this position it will be seen that downward movement of the tab 29 will cause the arm of the lever to engage the collar 32 moving the shaft downward into the position occupied by the left hand beater of this figure, thereby releasing the spring ring from the annular recess and allowing the beater to fall under gravity out of the spindle socket. The lever may be curved downward as shown at 33 in the areas at which the edge of the lever engages the collars 31 and 32.

Attention is directed particularly to two features; that is, the extreme simplicity of the construction and the effective and efficient manner in which it accomplishes its purpose. It will be seen that the spring rings serve to effectively maintain the beaters in their operative positions, and that the release mechanism consists of but two parts, the pin 23 and the lever 27, each of which may be cheaply made by high speed machine production operations. It will be seen that the lever 26 in no wise interferes with any of the normal functions of the mixer, and in no wise functions in retaining the beaters in position. The beaters are assembled in the mixer by merely inserting the end of the beater shaft in the spindle socket and moving the beater upward to its operative position. Since the lever is not tensioned in any manner but merely floats freely on its pivotal bearing 27, it in no wise interferes with the assembling of the beaters on the mixer. However, by means of the lever 27 and associated parts, the beaters are removed with the utmost facility. For example, the finger tab 29 may be grasped by the operator and the lever moved to its upper position, as shown in Figure 1. This forces the beater shaft 14 downward, moving the spring ring 21 out of the spindle socket 7, whereupon the beater will drop out of the socket under the action of gravity. Subsequently, the operator moves the tab 29 downward to its lowermost position, whereupon the lever engages the collar 32 of the beater shaft 15 moving the ring 22 out of the spindle socket 8, whereupon the beater shaft 15 will continue to fall under gravity, out of the spindle socket. Thus both of the beaters may be removed simply by an up and down movement of the finger tab 29 or of the finger tab 28 depending upon the convenience of the operator, or the beaters may be selectively removed dependent upon the direction of rotation of the lever 26.

I claim:

1. The combination in a household mixer of a casing, a pair of beaters having vertically disposed beater shafts supported on said casing in spaced relation, spring means for holding each of said shafts in a driven position on said casing, and manually operable means for selectively forcing said shafts out of said position against the action of said spring means to facilitate the removal thereof comprising a lever, means for pivotally supporting the lever intermediate its ends on the casing in spaced relation thereto, and means on opposite ends of the lever for manual rotation thereof from opposed sides of the mixer.

2. The combination in a household mixer of a casing, a pair of beaters having vertically disposed shafts supported on said casing in spaced relation, spring means for holding each of said shafts in a driving position on said casing, and a lever pivotally supported on said casing for manual rotation on an axis at right angles to the common plane of the shafts to selectively engage said shafts and thereby selectively force said shafts out of said position against the action of said spring means.

3. The combination in a household mixer of a casing, a pair of beaters having vertically disposed shafts supported on said casing in spaced relation, spring means for holding each of said shafts in a driving position on said casing, and a lever pivotally supported on said casing intermediate its ends at a point between said shafts for manual rotation to selectively engage opposite ends of said lever with said shafts and thereby selectively force said shafts out of said driven position against the action of said springs.

4. The combination in a household mixer of a casing, a pair of driven spindles carried on said casing, said spindles having sockets provided with annular recesses, a pair of beaters having shafts receivable in said sockets and having spring means seating in said annular recesses to determine the operative position of said shafts and retain the same in said sockets, a lever pivotally supported on said casing intermediate its ends at a point between said spindles for manual rotation in a plane parallel to the plane of the spindles, and annular collars on said shafts positioned for engagement by said lever upon rotation thereof, whereby to selectively force said shafts out of said operative positions against the action of said spring means to facilitate the removal of said beaters.

HORACE C. WRIGHT.